(12) United States Patent
Schwalb

(10) Patent No.: US 12,725,231 B2
(45) Date of Patent: Sep. 1, 2026

(54) METHOD AND SYSTEM FOR CHROMATIC ABERRATION REDUCTION

(71) Applicant: MOTHERSON INNOVATIONS COMPANY LIMITED, London (GB)

(72) Inventor: Martin Schwalb, Stuttgart (DE)

(73) Assignee: MOTHERSON INNOVATIONS COMPANY LIMITED, London (GB)

( * ) Notice: Subject to any disclaimer, the term of this patent is extended or adjusted under 35 U.S.C. 154(b) by 103 days.

(21) Appl. No.: 18/866,399

(22) PCT Filed: May 17, 2023

(86) PCT No.: PCT/EP2023/063228
§ 371 (c)(1),
(2) Date: Nov. 15, 2024

(87) PCT Pub. No.: WO2023/222747
PCT Pub. Date: Nov. 23, 2023

(65) Prior Publication Data

US 2025/0328995 A1 Oct. 23, 2025

(30) Foreign Application Priority Data

May 17, 2022 (DE) ......................... 102022204896.2
Jul. 15, 2022 (DE) ......................... 102022207263.4

(51) Int. Cl.
*G06T 5/73* (2024.01)
*G06T 7/13* (2017.01)
(Continued)

(52) U.S. Cl.
CPC .................. *G06T 5/73* (2024.01); *G06T 7/13* (2017.01); *G06T 7/90* (2017.01); *G06T 11/10* (2026.01);
(Continued)

(58) Field of Classification Search
None
See application file for complete search history.

(56) References Cited

U.S. PATENT DOCUMENTS

2008/0291447 A1 11/2008 Vakrat et al.
2010/0166305 A1 7/2010 Song et al.
(Continued)

FOREIGN PATENT DOCUMENTS

EP 1761072 A1 3/2007

OTHER PUBLICATIONS

International Search Report for Corresponding International Patent No. PCT/EP2023/063228, dated Aug. 8, 2023, filed May 17, 2023, 5 pages.
(Continued)

*Primary Examiner* — Frank S Chen
(74) *Attorney, Agent, or Firm* — Westman, Champlin & Koehler, P.A.

(57) ABSTRACT

A method and system for reducing the chromatic aberration in an image, more particularly using a data processing apparatus or system for reducing the chromatic aberration in an image of an environment that has been captured by an image capturing sensor and which is supposed to be displayed to a user. In particular, this method can be used on an image that has been captured by a wide-angle camera with the aim of displaying it to the driver of a vehicle (passenger car, transport truck, motorcycle, etc.) in order for instance to replace the internal and external mirrors of the vehicle.

9 Claims, 4 Drawing Sheets

(51) Int. Cl.
*G06T 7/90* (2017.01)
*G06T 11/10* (2026.01)

(52) U.S. Cl.
CPC ............... *G06T 2207/10024* (2013.01); *G06T 2207/20192* (2013.01)

(56) References Cited

U.S. PATENT DOCUMENTS

| | | | | |
|---|---|---|---|---|
| 2012/0002113 | A1* | 1/2012 | Nishio | H04N 25/611 348/E5.077 |
| 2015/0036927 | A1* | 2/2015 | Kang | G06T 5/80 382/167 |
| 2019/0327454 | A1* | 10/2019 | Waldl | G06T 5/80 |
| 2019/0355105 | A1 | 11/2019 | Rasmusson et al. | |
| 2023/0306676 | A1* | 9/2023 | Inada | G06T 7/12 |

OTHER PUBLICATIONS

Written Opinion for Corresponding International Patent No. PCT/EP2023/063228, dated Aug. 8, 2023, filed May 17, 2023, 5 pages.

Matthais Esser: "Standardization and Vehicle Regulation Aspects of Camera Monitor Systems" In: "Handbook of Camera Monitor Systems", Jan. 1, 2016, Springer International Publishing, Cham, XP055284843, vol. 5, pp. 51-100, ISBN: 978-3-319-29611-1.

* cited by examiner

METHOD AND SYSTEM FOR CHROMATIC ABERRATION REDUCTION

CROSS-REFERENCE TO RELATED APPLICATION

This application is a Section 371 National Stage Application of International Application No. PCT/EP2023/063228, filed May 17, 2023 and published as WO2023/222747A1 on Nov. 23, 2023, in English, which claims priority to and the benefit of German Patent Application Nos. 102022204896.2 filed May 17, 2022, and German Patent Application No. 102022207263.4 filed Jul. 15, 2022, respectively, the contents of which are incorporated herein by reference in their entireties.

FIELD OF DISCLOSURE

The present disclosure relates to a method for reducing the chromatic aberration in an image, more particularly to a method of using a data processing apparatus or system for reducing the chromatic aberration in an image of an environment that has been captured by an image capturing sensor and which is supposed to be displayed to a user. In particular, this method can be used on an image that has been captured by a camera which has a angle of view above a certain value, in particular wide-angle camera with the aim of displaying it to the driver of a vehicle (passenger car, transport truck, motorcycle, etc.) in order for instance to replace the internal and external mirrors of the vehicle.

TECHNICAL BACKGROUND

As image capturing and rendering technologies have progressed enormously in terms of both quality and cost reduction, it is now possible to offer—at low cost and with high rendering quality—the replacement of vehicle interior and exterior mirrors with image capturing and rendering devices for the driver. Images are captured by cameras that are positioned in directions corresponding to the directions observed by the mirrors that are to be replaced. The image rendering is then made through a display unit visible to the driver, for example at the place where the mirror that can be replaced is located or at any point of the dashboard provided that the display is observable by the driver without disturbing his driving. Ideally, one seeks to use a reduced number of image sensors in order to limit the costs related to both the price of a sensor and the need for image data processing in the event that the images of many sensors must be merged. Thus, one of the preferred solutions is to use camera which have an angle of view which is above a certain minimal value. Ideally, wide-angle cameras could be used to fit the purpose of reducing the number of cameras, even if it is not necessary. The cameras with such a certain minimal value of view angle have the advantage of being able to capture a larger area around the vehicle in order to render a large amount of information about the environment surrounding the vehicle. However, one of the drawbacks of using them is that these cameras are more sensitive to chromatic aberrations. Wide angle cameras are even more particularly sensitive to such a chromatic aberration. Even if the effect of chromatic aberration depends on many factors (e.g., sensors size, number of pixel, lens quality, etc.), it can be estimated that for most video sensors on the market currently, the chromatic aberration usually starts to be visible for values of view angle above 60°, more generally from 70° and almost every time beyond 80°. Thus, the images captured whilst trying to obtain an image with a large field of view with a limited number of cameras are often of limited quality, unless the image capturing and rendering systems are equipped with high-performance, and therefore expensive, lenses and sensors. This solution would thus result in a considerable increase in the costs of the system and make this solution an irrelevant replacement for the previous technology based on mirrors.

Chromatic aberrations are color fringes or bangs that are visible around objects in a captured image. That is to say that around an object, some colors halos can be visible. These halos/fringes/bangs can be observable in the data image as colored pixels being mixed up around the profile of a captured object. This phenomenon is caused by the inability of the image sensor lens to converge all colors to the same point. These chromatic aberrations are particularly present in areas of high contrast and/or high distortion of the image. In other words, they are all the stronger that the area concerned is not homogeneous (for example, it includes a boundary between objects of very different colors) and that it is far from the center point of the image captured (i.e., far from the point where the image is the least distorted). For example, a wide-angle camera with a large area away from the center point of the distorted image will be particularly susceptible to chromatic aberrations when shooting heterogenous environments/objects.

In the case of radially symmetrical normal lenses, light of different wavelengths coming from the same direction (i.e., from the same object) arrives at different points in the image. This difference in position on the image is along the radial direction (i.e., from the center of the image to the outside of the image, where the outside of the image corresponds to points closer to the boundary of the image sensor).

In the so-called homogeneous areas of the image, i.e., areas where the color between contiguous points is little variable (in other words, where the pixels in the same region have a very or fairly close color), chromatic aberration is little or not visible. Conversely, in areas of high contrast (where contiguous pixels have very variable colors), such as the ends of homogeneous areas, the phenomenon of chromatic aberration will be amplified, and its result will be visible. For example, the edges (or contours, boundaries) of objects in the image will tend to be more susceptible to chromatic aberration, as they usual show a disruption in the color pattern. However, in a radial direction the visibility of chromatic aberration depends particularly on the orientation of the edge (or contour) concerned. For example, an edge oriented in the radial direction (i.e., from the center to the periphery of the image), will have a chromatic aberration little or almost not visible. In contrast, an edge on a tangential orientation (i.e., on a tangent line to a circle with the center of the image or on a line perpendicular to the radial direction from the center to the periphery of the image) will have a chromatic aberration particularly visible.

Note that the width of the region affected by chromatic aberration at a certain position in the image depends only on the properties of the lens of the image sensor but does not depend on the scene from which the image was captured. In other words, it does not depend on the image content.

Several methods have been implemented to try to correct this defect.

A first approach consists in a geometric correction per channel. In this approach, the correction of chromatic aberration is performed by warping/deforming the red, green and blue channels of the sub-pixels using different warping/deformation mappings. This approach is intended to compensate for chromatic aberration across the entire image, regardless of whether the image contains edges (where chromatic aberration is strongest and therefore particularly visible) as explained earlier. This approach has long been preferred in that it does not simply correct the symptoms of chromatic aberration but adjusts the geometric differences of each channel independently. However, this approach requires resampling with interpolation. That is, this approach causes both a large computational load and a large memory bandwidth usage. These requirements lead to the need for the implementation of very powerful hardware components, i.e., of a high cost making this solution little or not possible in the case, for example, of the replacement of the rear-view mirrors of a vehicle. Indeed, the restored image must be close to the one observed by the human eye in a mirror, the number of images per second to restore must reach a certain level (ideally at least 50 images per second), requiring the use of very powerful and expensive hardware components. Similarly, it is to be noted that—even if efficient/costly hardware is available—this approach does not allow an efficient distribution of computing tasks on the hardware available, since the more powerful/expensive hardware cannot be kept for more demanding tasks.

A second approach is based on edge detection. The different edges in all orientations at all positions in the image are detected. Chromatic aberrations on or next to these edges are then removed. This approach has the disadvantage that the edges must be detected in both a horizontal and a vertical direction in order to find the edges in each orientation. That is, the image must undergo a double scan in each of these two directions, which results in a significant computational and data transfer burden. Indeed, these methods do not make assumptions about the width of the effect of chromatic aberrations on an edge at a certain position in the image. These methods implement an approach that is dynamic, i.e., based on the content of the image. Thus, two pixel positions on the left and right (or top and bottom) beyond the area of influence of chromatic aberration around the edge are dynamically determined. This dependency on the image content makes the computation time unpredictable, which is a serious problem for any real-time application using low-powered processors such as ECUs (Electronic Command Units) used in vehicle electronics.

SUMMARY OF THE DISCLOSURE

There is now the need to provide a solution to correct or at least reduce chromatic aberration on an image captured, whilst limiting the need for complex and expensive hardware, and allowing its use for real-time applications, such as the replacement of the mirror in a vehicle.

The present application provides according to aspects of the present invention a method for reducing chromatic aberration in an image using a computer system, an image capturing and rendering system, a vehicle, a computer program product and a computer-readable storage medium.

In more details, a first aspect of the present disclosure is a method for reducing chromatic aberration in an image using a computer system, wherein the method comprises: obtaining a source image which has been captured by an image sensor; detecting, by a processor, one or more edges in the obtained source image; determining, by the processor, one or more edges that are tangentially oriented among the one or more detected edges; and reducing, by the processor, the chromatic aberration on the one or more determined tangentially oriented edges in the source image to obtain a destination image.

In an embodiment of the first aspect, the steps of detecting the one or more edges and determining the one or more edges that are tangentially oriented further comprises: setting, by the processor, a first position in the captured source image; determining, by the processor, a second position and a third position in the source image, wherein the second position and the third position surround the first position and are together aligned with the first position in a radial direction from the a center of projection of the image, and wherein a width between the second position and the third positions corresponds to a distance of influence of the chromatic aberration over the radial direction passing through the first, second and third position; and evaluating whether the first position is a tangential edge based on the value of the source image at the first position, at the second position and at the third position.

In a further embodiment of the first aspect, the position data of the second position and the third position for a first position are pre-calculated and depends on the features of the image sensor which has captured the source image.

In yet another embodiment of the first aspect, the position data of the second position and the third position for a first position are stored in and retrieved from a memory in the form of a look up table.

In yet another embodiment of the first aspect, the image sensor is a wide-angle camera.

In yet another embodiment of the first aspect, the source image is captured and processed as a RAW data in RGGB format.

In yet another embodiment of the first aspect, the second position and a third position in the image are placed on a subpixel of a color different than the color of the sub pixel on which the first position is placed, and the method further comprises: determining a fourth position and a fifth position, wherein the fourth position is the closest position to the second position which is placed on a subpixel of the same color of the one on which the first position is placed, and wherein the fifth position is the closest position to the third position which is placed on a subpixel of the same color of the one on which the first position is placed, and evaluating whether the first position is on a tangential edge is based on the value of the source image at the fourth position and at the fifth position.

In yet another embodiment of the first aspect, the fourth position and the fifth position are pre-calculated and are stored in and retrieved from a memory in the form of a look up table.

In yet another embodiment of the first aspect, the source image and the destination image are decomposed in a plurality of corresponding rectangular blocks to be stored in a memory, and wherein the corresponding blocks of the source image are slightly bigger than the one of the destination image.

In a further embodiment of the first aspect, the method further comprises storing a buffer of the source image and a buffer of the destination image in DRAM portion of the memory; storing precomputed second positions and third positions data corresponding to first positions or precomputed fourth positions and fifth positions data corresponding to first positions in either an SRAM or a DRAM portion of the memory; linearly copying a larger source block from the buffer of the source image to a SRAM portion of the memory; reading the linearly copied source block in a random access pattern from the SRAM portion of the memory; accessing, the precomputed second positions and third positions data or the precomputed fourth positions and fifth positions data in linear access.

A second aspect of the present disclosure is an image capturing and rendering system, the system comprising: one or more image sensors configured to capture a source image; one or more memories configured to store data relating to the source image, characteristics of a lens of the image sensor, instructions for carrying out the chromatic aberration reduction method, in particular a method according to the present disclosure, on the source image to obtain a destination image; and a processor configured to perform instructions stored in the memory.

In an embodiment of the second aspect, the system further comprises a display for displaying the destination image.

A third aspect of the present disclosure is a vehicle comprising: a camera mirror replacement system comprising: an image capturing and rendering system according to the second aspect of the present disclosure wherein the display of the system is positioned on a dashboard of the vehicle or at a position replacing an interior or an exterior mirror of the vehicle.

A fourth aspect of the present disclosure is a computer program product comprising instructions which, when the program is executed by a computer, cause the computer to carry out the steps of the method according to the first aspect of the present disclosure.

A fifth aspect of the present disclosure is a computer-readable storage medium comprising instructions which, when executed by a computer, cause the computer to carry out the steps of the method according to the first aspect of the present disclosure.

The solution presented by the present application is based on the detection of tangentially oriented edges and on the correction of chromatic aberrations on these edges only. Indeed, the present application uses the knowledge on the radial direction from the center of projection to the proximity of the sensor as well as the knowledge of the differences of position between the various color channels due to the chromatic aberration at various positions of the image. Thus, in the case where it is determined the presence of an edge at a certain pixel position in the image, it can be directly obtained a second and third position along the radial direction that are known to be beyond the area of influence of the chromatic aberration of the edge at the pixel position. This second and third position for any edge pixel position depend only on the properties of the lens and the sensor. They are completely independent of the image content. Thus, the second and third position can be precalculated, for example offline or on a PC, and can be obtained at the time of the initialization phase before applying on the image an algorithm of reduction of the chromatic aberration. By this approach, the so-called runtime for determining the second and third positions for a starting pixel position during the implementation of the chromatic aberration reduction algorithm is constant. This feature makes it possible to use this approach for real-time implementations using low-power processors (such as low-power ECUs in vehicles).

Another advantage of the present solution is that it can be used on RAW image data (such as RGGB) at the sensor output before any image pre-processing step (e.g., debayering).

Moreover, this approach has the advantage that it can be implemented by exploiting the properties of the different forms of memory (Random Access Memory-RAM) available.

Advantageous configurations and developments emerge from the further dependent claims and from the description with reference to the figures of the drawings.

Where appropriate, the above-mentioned configurations and developments can be combined in any manner. Further possible configurations, developments and implementations of the disclosure also include combinations, which are not explicitly mentioned, of features of the disclosure which have been described previously or are described in the following with reference to the embodiments. In particular, in this case, a person skilled in the art will also add individual aspects as improvements or supplements to the basic form of the present disclosure.

CONTENT OF THE DRAWINGS

The present disclosure is described in greater detail in the following on the basis of the embodiments shown in the schematic figures of the drawings, in which.

Figure 1:
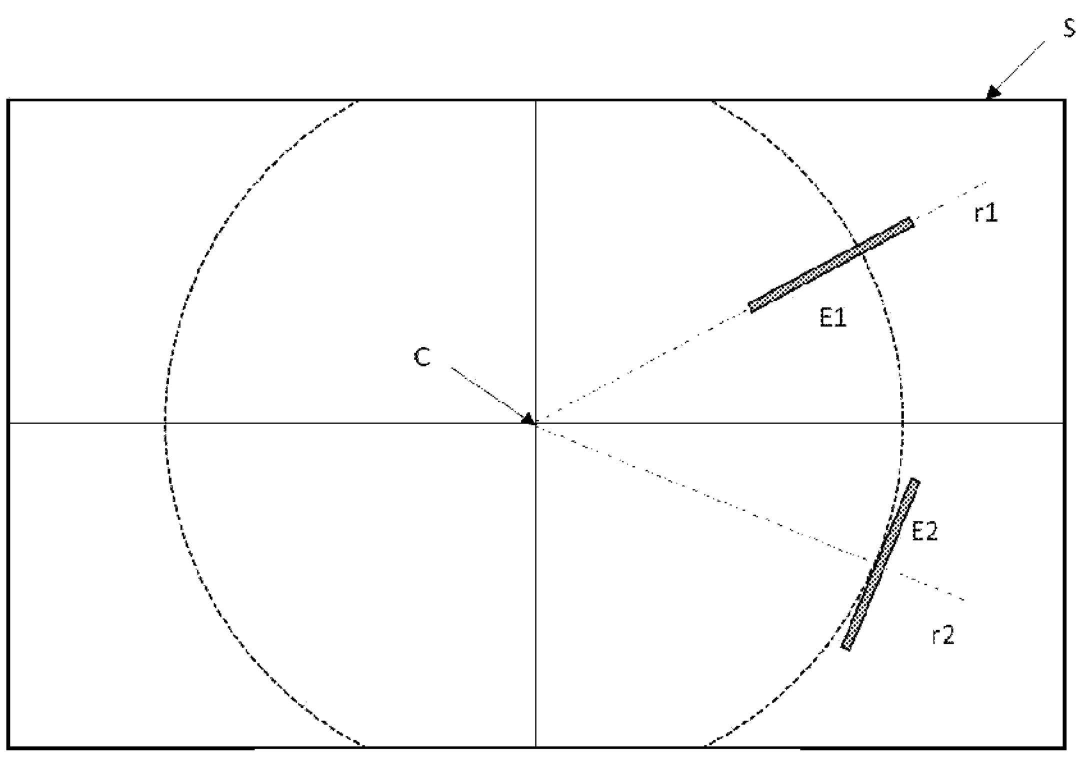
FIG. 1 is a representation of an image captured by an image sensor corresponding to a source image.

The appended drawings are intended to provide further understanding of the embodiments of the disclosure. They illustrate embodiments and, in conjunction with the description, help to explain principles and concepts of the disclosure. Other embodiments and many of the advantages mentioned become apparent in view of the drawings. The elements in the drawings are not necessarily shown to scale.

In the drawings, like, functionally equivalent and identically operating elements, features and components are provided with like reference signs in each case, unless stated otherwise.

DESCRIPTION OF EMBODIMENTS

Hereinafter, the embodiments will now be described in detail with reference to the accompanying drawings. However, the disclosure cannot be limited to the embodiment in which the idea of the disclosure is presented, and another embodiment included within range of idea of another backward disclosure, or the present disclosure may be easily proposed by addition, change, deletion and the like of another element.

The terms used in this specification were selected to include current, widely-used general terms. In certain cases, a term may be one that was arbitrarily established by the applicant. In such cases, the meaning of the term will be defined in the relevant portion of the detailed description. As such, the terms used in the specification are not to be defined simply by the name of the terms but are to be defined based on the meanings of the terms as well as the overall description of the present disclosure.

Hereinafter, embodiments of the present disclosure will be described in detail with reference to the accompanying drawings. It should be noted that the same reference numerals are used to designate the same or similar elements throughout the drawings.

FIG. 1 is a representation of an image captured by an image sensor 10 corresponding to a source image S. The source image S may be in the form of a quadrilateral, in particular a rectangle, whose sides form an image frame. The center C of the source image S can correspond to the point in the direction of which the image sensor 10 points. It is then said to be the center of projection of the image because at this point the image is not distorted. The image then extends to the sides of the image frame in a radial direction from this center point C, so that the further a point in the image is from the center of projection C, the closer it is to the boundary of image sensor 10 that captured it. So that the areas of the image close to the edges of the image correspond to areas where the image can be distorted due to the projection effect.

Two radial directions r1 and r2 are shown in FIG. 1 from the center C to the periphery. The source image S can contain different types of objects, people or structures etc. That is to say that the light intensity of each point of the image, as well as its color, can in certain zones be homogeneous when for example in this zone is located a wall of a homogeneous/constant color. The points of color can also have in some places of the image light intensities and colors very heterogeneous due to the fact that the image includes the edges of one of the previously mentioned objects. For example, the profile lines of another vehicle or a pedestrian will normally be very heterogeneous areas in that the object and its surroundings usually have very dissimilar colors. The boundary lines between these different colors/light intensities on the sensor points—and thus on the source image—are called edges. FIG. 1 illustrates this point by showing two types of edges. At the top right of the source image S, an edge E1 is oriented in the radial direction r1. As explained earlier, chromatic aberration on this type of edge is little or not visible. At the bottom right of the image is a second type of edge, called tangential edge E2 because it is tangential to a circle around the central point C of projection and is perpendicular to the radial direction r2. The chromatic aberration is much more visible on a tangential edge E2. The object of the present disclosure is to detect the tangential edges in the image. This can be done by firstly detecting edges and subsequently determining whether they are tangential edges, or directly detecting only the tangential edges. Once determined, the chromatic aberration near these tangential edges is then corrected/reduced.

Figure 2:
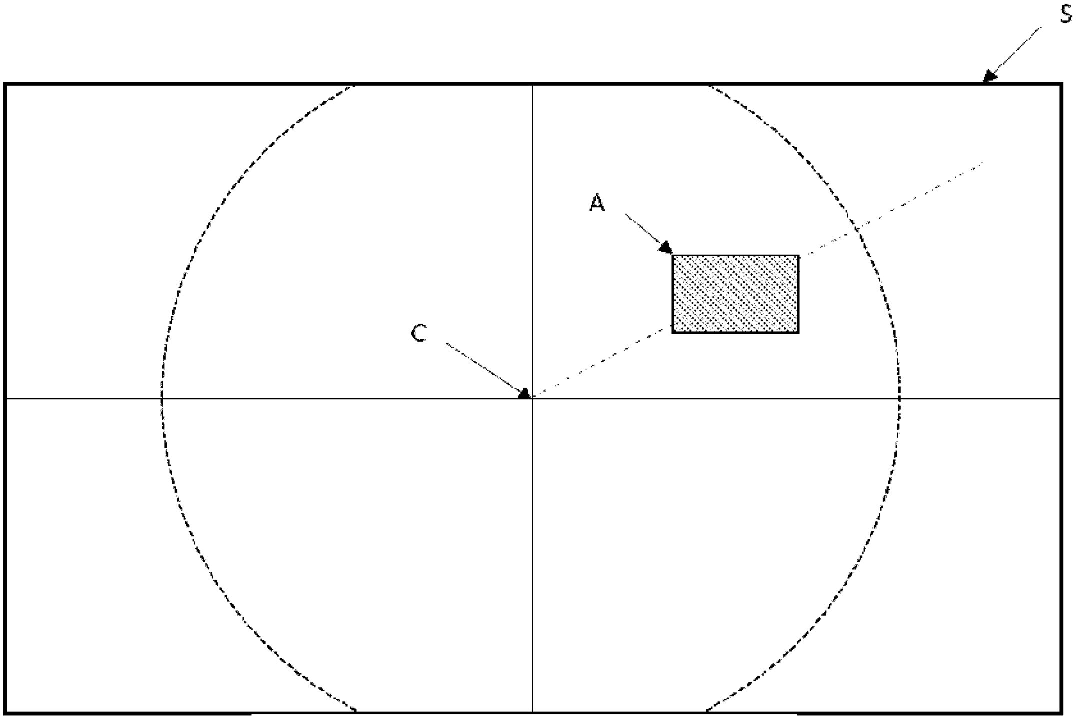
FIG. 2 is a representation of a source image as shown in FIG. 1 on which is illustrated a magnification region.
Figure 3:
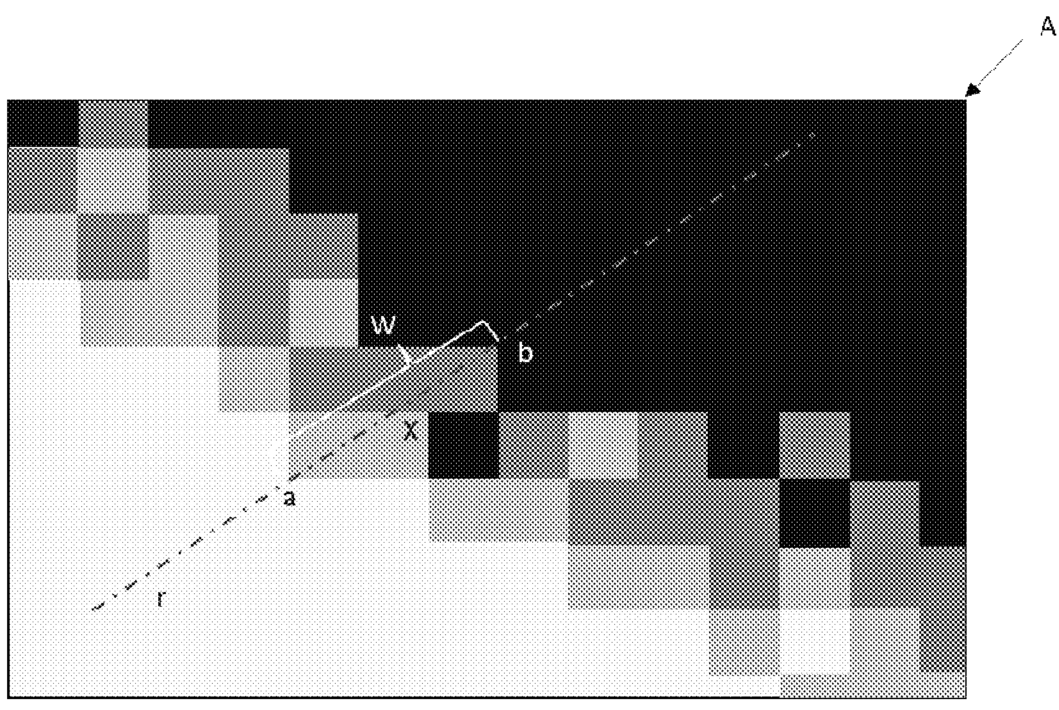
FIG. 3 is an enlargement of the source image with pixels of different colors/light intensities on an edge of the image.

FIG. 2 is a representation of a source image S as shown in FIG. 1 on which is illustrated a magnification region A containing a relatively tangential edge. FIG. 3 is an illustration of the area of the source image S corresponding to the magnification area A as shown in FIG. 2.

FIG. 3 is an enlargement of the source image with pixels of different colors/light intensities. In this illustration, the color/light intensity ranges from light gray to black. The skilled person will understand that this is a black and white representation, but that the distribution of the pixels may correspond to an RGGB matrix (Red, Green, Green, Blue) or any other type of matrix used to capture color images (and thus pixels and sub-pixels). If a point or position x corresponding to an edge (as discussed above) is chosen, the points or positions a and b corresponding to the beginning and end of the area of influence of chromatic aberration on a radial direction passing through the point x can be determined. These points a and b, as well as their spacing W, depend only on the characteristics of the image sensor (i.e., its lens). In other words, it is possible to predetermine (i.e., pre-calculate) these points with respect to each of the positions x in the source image, as soon as the characteristics of the image sensor (and its lens) used are known. Indeed, the area of influence of the chromatic aberration (the space in which the chromatic aberration will be visible on the destination image which would not have been reprocessed) does not depend on the image in itself but on the characteristics of the image sensor.

In the following detailed example, the solution is used on RAW RGGB (Red Green Green Blue) image data before any debayering step. In other words, for each pixel present in the source image, there are only three channel values present: red, green and blue. In this example, it is possible that the positions a and b for a position x do not fall on a sub-pixel of the same color. To solve this problem, points a' and b' are used instead. These points are the closest points of points a and b, respectively, which fall on a subpixel of the same color as that of point x, as shown in FIG. 4.

Figure 4:
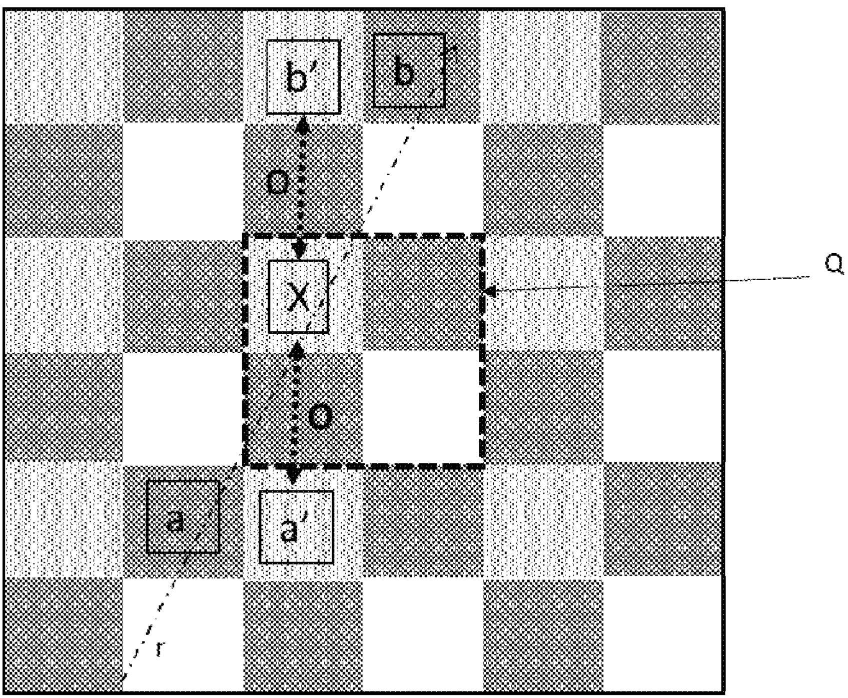
FIG. 4 is a magnification of a source image, where a position is determined to be on a tangential edge that is placed on a radial direction from the projection center of the image and where two other positions are on subpixels of another color.

FIG. 4 shows a magnification of a source image S where a position x is determined to be on a tangential edge that is placed on a radial direction r from the projection center of the image and where positions a and b are on subpixels of another color. In the illustration in FIG. 4, the white squares represent subpixels of blue color, the white squares with black dots represent subpixels of red color and the dark gray squares with white dots represent subpixels of green color. Also, the x position is on a red subpixel of the RGGB quadruple named Q, while the a and b positions are on green subpixels. Also, the closest subpixels of red color are chosen for the position of points a' and b'.

Figure 5:
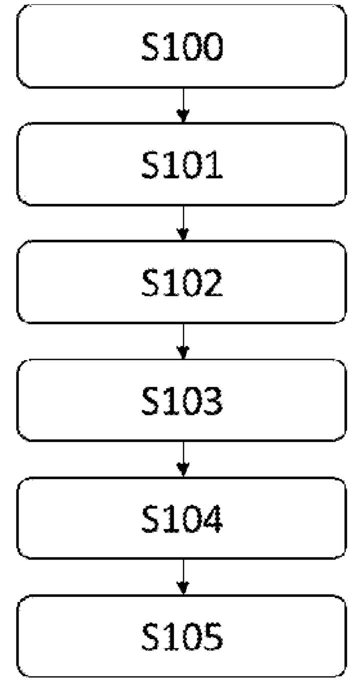
FIG. 5 is detailed version of the implemented method according to one embodiment of the present disclosure.

In the context of this example with raw RGGB sensor output data, a detailed version of the implemented method is now presented and illustrated in FIG. 5.

In step S100, a source image S is captured by an image sensor 10 of an image capturing and rendering system 101. This source image S is in the form of an RGGB matrix comprising green, red and blue sub-pixels, as well as the associated values for each of these sub-pixels. It should be noted that two green sub-pixels, a red sub-pixel and a blue sub-pixel form a quadruple RGGB Q as shown in FIG. 4.

In step S101, a data processor 12 of the image capturing and rendering system 101 receives the source image S. It may receive it directly from the image sensor or from a memory 11 of the system 101 on which the source image data would have been saved.

In step S102, a position x is set in the source image S. The corresponding positions a and b along the radial direction r are then determined. These positions can for example be saved in the memory 11 of the image capturing and rendering system 101. They may be saved, for example, as a table of corresponding values, or for each position x, a pair of positions a and b are shown. Positions a' and b' can then be determined if positions a and b are on different colored subpixels than the pixel where position x is located. Positions a' and b' being the positions closest to positions a and b, respectively, having the same subpixel color as position x. Preferably, the pair of corresponding positions a' and b' are saved for a position x, so that these positions can be determined directly without going through the determination of positions a and b.

In step S103, if the position x is on a green subpixel, the value for position x in the destination image D, i.e. the image to be obtained after the effect of chromatic aberration has been reduced or corrected, corresponds to the value in the source image S.

In step S104, if the position x is on a red colored sub-pixel, the red values of positions x, a' and b' are read. Similarly, the average value of the green values of the other two green subpixels of the same RGGB quadruple of the positions x, a' and b' are read. Next, it is evaluated whether the x position is on a tangential edge from the red and green values of the x, a' and b' positions that were just read. If it is determined that position x is on an edge: a limiting range is evaluated as the minimum and maximum scale of the red to green difference at the two positions a' and b', with a scale factor f that allows for color suppression at the edges, and the red value in the destination image D is limited by the limiting range thus evaluated. If the position x is not an edge, then the destination value in destination image D for position x is equal to the value for position x in source image S.

In step S105, if the position x is on a blue colored sub-pixel, the blue values of positions x, a' and b' are read. Similarly, the average value of the green values of the other two green subpixels of the same RGGB quadruple of the positions x, a' and b' are read. Next, it is evaluated whether the point x is on a tangential edge from the blue and green values of the positions x, a' and b' that were just read. If it is determined that point x is on an edge: a limiting range is evaluated as the minimum and maximum scale of the blue to green difference at the two positions a' and b', with a scaling factor f that allows for color suppression on the edges, and the blue value in the destination image D is limited by the limiting range thus evaluated. If the position x is not an edge, then the destination value in the destination image D for position x is equal to the value for position x in source image S.

It is to be noted that an alternative approach is to define that the positions a' and b' are distant from a distant O from the position x (See FIG. 4). That is to say that instead of passing through the determination of the positions a and b, and then a' and b', or even instead of passing only through the positions a' and b', only a 2 dimensional vector O defining the distance of these positions from the position x can be saved (for instance as byte-offset to the pixel position described). This distance vector or "offset vector" can be used for determining the position a' and b'. This approach allow a drastic reduction in the necessary memory for saving the corresponding table x with the other positions.

Furthermore, the lookup table can even further be reduced by storing only a single common offset (o) for "n" (n=2, 4 or 8) neighboring pixels in a (horizontal) row in an approximation approach. In such an approach, larger errors occur only in the center of the image (close to point C). However, in these areas of the image the range of influence of the chromatic aberrations is so small that the positions a' and b' fall on the same point as (x) and the offset thus becomes "(o)=0". By using this approximation approach, the size of the lookup table can be further reduced once again to the factor "1/n" of the previous size.

Figure 6:
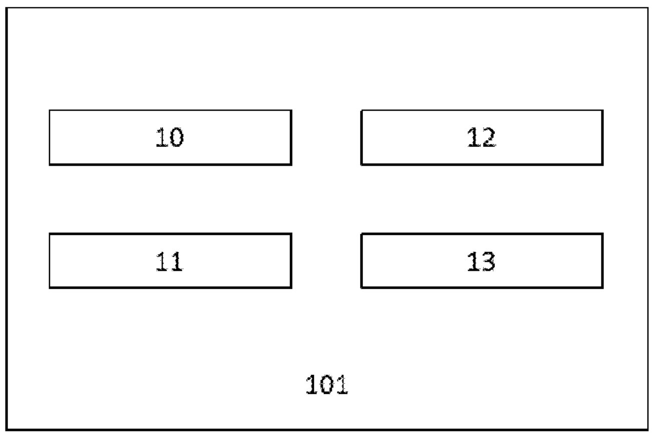
FIG. 6 depicts an image capturing and rendering system having an image sensor chromatic aberration correction function according to the present disclosure.

FIG. 6 depicts an image capturing and rendering system 101 having an image sensor chromatic aberration correction function according to the present disclosure. The system may include one or more image sensors 10 that will capture the source image S. The one or more image sensors are preferably wide-angle cameras. In addition, the system may comprise one or more memories 11 which will be able to store elements relating to the source image S, the characteristics of the sensor lens, one or more tables for converting the x positions to the corresponding a and b or a' and b' positions, elements relating to the destination image D, a computer program for carrying out the chromatic aberration correction function in the source image S. The system 101 may also include a processor 12 that will perform the function of processing the source image S in order to reduce the visible influence of chromatic aberrations on the tangential edges as presented previously. To do this, the processor 12 may use instructions stored in the memory(s) 11. The system may also include a display 13 for rendering the destination image D to a user. The image capturing and rendering system 101 may be placed in a vehicle to be use as camera monitor system (CMS) or/and a camera mirror replacement system (CMRS) replacing the interior and exterior mirrors of the vehicle.

The presented solution has the ability to be implemented on different types of memories and to draw corresponding advantages. The different types of memory that can be used are for example DRAM (Dynamic Random Access Memory) or SRAM (Static Random Access Memory). In general, the disclosure can be implemented using a large amount of DRAM memory and a small amount of SRAM memory. DRAM memory is fast for sequential access but slow for random access. SRAM memory is fast for both sequential and random access. It is possible to copy image data between DRAM and SRAM memory via DMA (Direct Memory Access).

Figure 7:
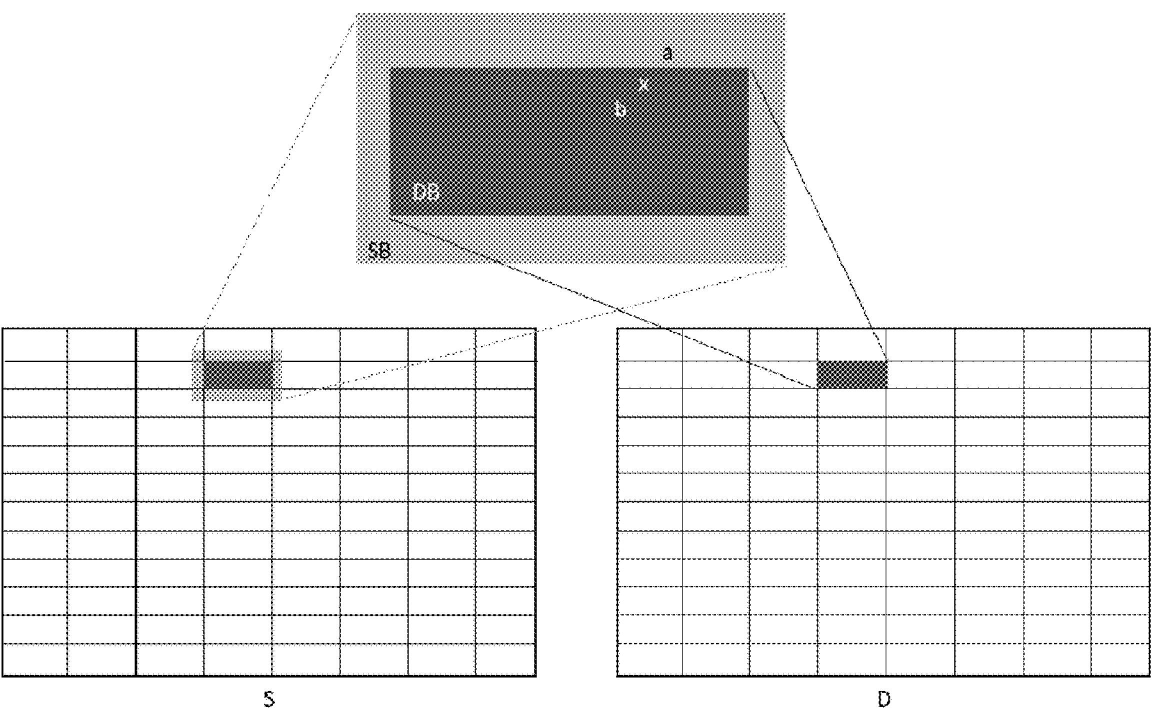
FIG. 7 illustrate a possible way to decompose the source and destination images for storing data in a memory according to one embodiment of the present disclosure.

FIG. 7 illustrates that the destination image D can be decomposed into a plurality of rectangular destination blocks DB for storage. Nevertheless, when reading a source block SB from the source image S, it may be necessary to access data outside what would be the block corresponding to the destination block in the source image S. Indeed, as illustrated in FIG. 7, if the chosen position x is at the edge of the block and one of the two positions a or b (or a' or b') were to be outside this block, it would be necessary to have a reading block larger than the destination block DB, to facilitate access without the need to read all the surrounding blocks. In the example of FIG. 7, it can be seen that the source block SB must be larger than the destination block DB, in order to be able to include the position a.

Figure 8:
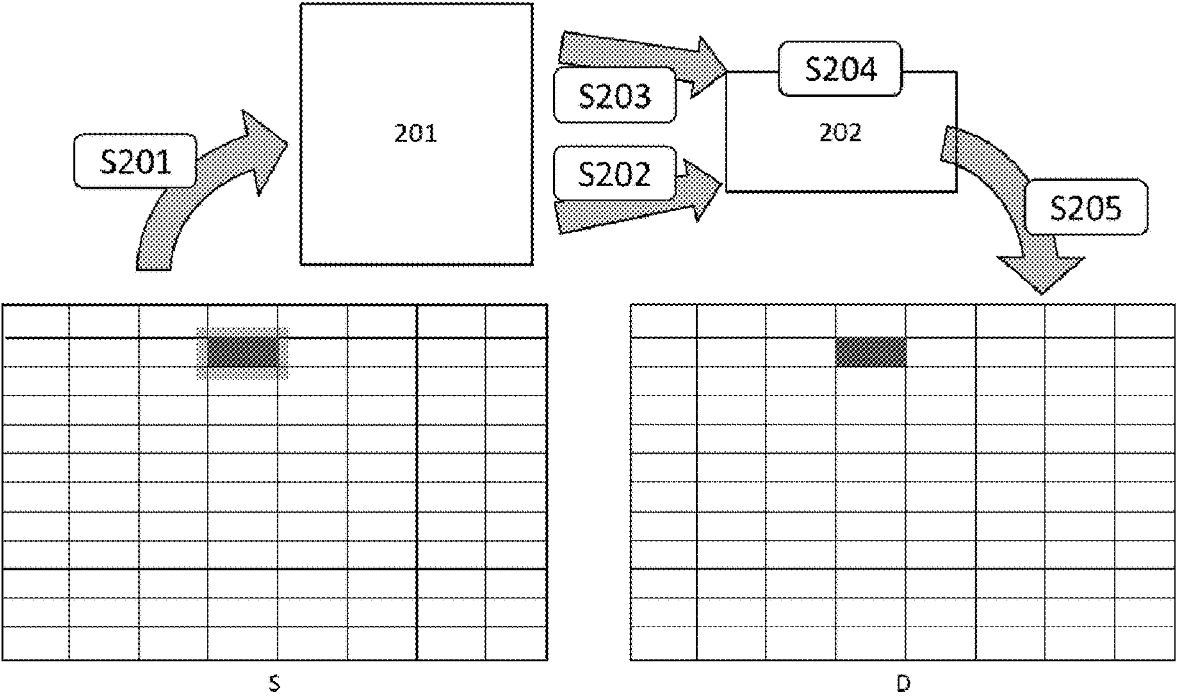
FIG. 8 illustrate a method of using the advantages of different type of memories for implementing the aberration correction function according to one embodiment of the present disclosure.

During the process related to position x as shown in FIG. 8, each position of the destination block DB only needs to be written once. On the other hand, several positions must be read from the source block SB, in order to define the final result to be stored at position X in the destination image D. In other words, the source block is read in random-access pattern and each position can be read several times. The destination block DB is written in linear pattern and each position is written only once. Thus, in step S201, the source image buffer S is stored in memory 201, more particularly in the DRAM portion of memory 201, the destination image buffer D is stored in memory 201, more particularly in the DRAM portion of memory 201, and the precomputed positions a and b (or a' and b') corresponding to each position x are stored in memory 201, either in an SRAM portion or in a DRAM portion. In the same step, before proceeding on a source block SB, a DMA copy is used to linearly copy a slightly larger block for the source block from the DRAM memory to the SRAM memory. In step S202, the resulting source block is read in a random-access pattern from SRAM. In step S203, the precomputed position data a and b are accessed in linear access. In step S204, the read data is provided to the algorithm 202 to compute the destination block data. In step S205, the destination block DB is saved.

In this same implementation example, the DMA copy and the execution algorithm can be pipelined, to run in parallel. For example, at a time 1, the DMA copies the first block into SRAM 1. At time 2, the DMA copies the second block into SRAM 2 and the algorithm is used on block 1 in SRAM 1. In other words, at time t=i, the DMA copies the ith block in SRAM i and the algorithm is used on block i−1 in SRAM i−1. It is to be noted that only two SRAM buffers are necessary in this case, as there is a need for a buffer onto which it is being written and a buffer from which it is read. Taking the example, when writing the 3rd block, the SRAM 1 which content has been read already can be erased and the $3^{rd}$ block can be written on it, such that there is no need for a SRAM 3. Indeed, the two buffers can just be swapped.

Although the present disclosure has been described in the above by way of preferred embodiments, it is not limited thereto, but rather can be modified in a wide range of ways. In particular, the disclosure can be changed or modified in various ways without deviating from the core of the disclosure.

The invention claimed is:

1. A method for reducing chromatic aberration in an image using a computer system, wherein the method comprises:

obtaining a source image which has been captured by an image sensor;

detecting, by a processor, one or more edges in the obtained source image;

determining, by the processor, one or more edges that are tangentially oriented among the one or more detected edges; and reducing, by the processor, the chromatic aberration on the one or more determined tangentially oriented edges in the source image to obtain a destination image, wherein the steps of detecting the one or more edges and determining the one or more edges that are tangentially oriented further compromises:

setting, by the processor, a first position in the captured source image;

determining, by the processor, a second position and a third position in the source image, wherein the second position and the third position surround the first position in a radial direction from the a center of projection of the image, and wherein a width between the second position and the third positions corresponds to a distance of influence of the chromatic aberration over the radial direction passing through the first, second and third position; and evaluating whether the first position is a tangential edge based on the value of the source image at the first position, at the second position and at the third position, wherein the source image is captured and processed as a RAW data in RGGB format, and wherein the second position and a third position in the image are placed on a subpixel of a color different than the color of the sub pixel on which the first position is placed, the method further comprises:

determining a fourth position and a fifth position, wherein the fourth position is the closest position to the second position which is placed on a subpixel of the same color of the one on which the first position is placed, and wherein the fifth position is the closest position to the third position which is placed on a subpixel of the same color of the one on which the first position is placed, and evaluating whether the first position is on a tangential edge is based on the value of the source image at the fourth position and at the fifth position.

2. The method of claim 1, wherein the position data of the second position and the third position for a first position are pre-calculated and depends on the features of the image sensor which has captured the source image.

3. The method according to claim 2, wherein the position data of the second position and the third position for a first position are stored in and retrieved from a memory in the form of a look up table.

4. The method according to of claim 1, wherein the image sensor is a wide-angle camera.

5. The method of claim 1, wherein the fourth position and the fifth position are pre-calculated and are stored in and retrieved from a memory in the form of a look up table.

6. The method according to of claim 1, wherein the source image and the destination image are decomposed in a plurality of corresponding rectangular blocks to be stored in a memory, and wherein the corresponding blocks of the source image are slightly bigger than the one of the destination image.

7. The method according to of claim 6, further comprising:

storing a buffer of the source image and a buffer of the destination image in DRAM portion of the memory;

storing precomputed second positions and third positions data corresponding to first positions or precomputed fourth positions and fifth positions data corresponding to first positions in either an SRAM or a DRAM portion of the memory;

linearly copying a larger source block from the buffer of the source image to a SRAM portion of the memory;

reading the linearly copied source block in a random access pattern from the SRAM portion of the memory;

accessing, the precomputed second positions and third positions data or the precomputed fourth positions and fifth positions data in linear access.

8. An image capturing and rendering system, the system comprising:

one or more image sensors configured to capture a source image;

one or more memories configured to store data relating to the source image, characteristics of a lens of the image sensor, instructions for carrying out the chromatic aberration reduction method on the source image to obtain a destination image; and, wherein the chromatic aberration reduction method comprises:

obtaining a source image which has been captured by an image sensor;

detecting, by a processor, one or more edges in the obtained source image;

determining, by the processor, one or more edges that are tangentially oriented among the one or more detected edges; and reducing, by the processor, the chromatic aberration on the one or more determined tangentially oriented edges in the source image to obtain a destination image, a processor configured to perform instructions stored in the memory.

9. The system of claim 8, further comprising a display for displaying the destination image.

* * * * *